(12) United States Patent
Schneider et al.

(10) Patent No.: US 9,513,005 B2
(45) Date of Patent: Dec. 6, 2016

(54) INTELLIGENT OXYGEN LEVEL CONTROLLER FOR BIOFUEL-FIRED BURNER

(71) Applicant: ClearStak LLC, Woodstock, CT (US)

(72) Inventors: John Schneider, Pomfret Ctr., CT (US); Matt Fraga, Hebron, CT (US); Eric Dithrich, Brimfield, MA (US); Jeffrey R. Hallowell, Woodstock, CT (US)

(73) Assignee: Biomass Controls, LLC, Putnam, CT (US)

( * ) Notice: Subject to any disclaimer, the term of this patent is extended or adjusted under 35 U.S.C. 154(b) by 50 days.

(21) Appl. No.: 14/460,782

(22) Filed: Aug. 15, 2014

(65) Prior Publication Data

US 2015/0211738 A1 Jul. 30, 2015

Related U.S. Application Data

(62) Division of application No. 13/290,082, filed on Nov. 5, 2011, now Pat. No. 8,812,162.

(60) Provisional application No. 61/410,598, filed on Nov. 5, 2010.

(51) Int. Cl.
| | |
|---|---|
| G05B 15/00 | (2006.01) |
| G05B 13/00 | (2006.01) |
| F23G 5/00 | (2006.01) |
| F23N 3/08 | (2006.01) |
| F23B 90/08 | (2011.01) |
| F23G 7/07 | (2006.01) |
| F23G 7/10 | (2006.01) |
| F23N 3/04 | (2006.01) |

(Continued)

(52) U.S. Cl.
CPC ............. *F23N 3/085* (2013.01); *F23B 90/08* (2013.01); *F23G 5/00* (2013.01); *F23G 7/07* (2013.01); *F23G 7/10* (2013.01); *F23N 3/042* (2013.01); *F23N 5/006* (2013.01); *F23N 5/022* (2013.01); *G05B 13/00* (2013.01); *G05B 15/00* (2013.01); *F23G 7/00* (2013.01); *F23N 2025/10* (2013.01); *F23N 2033/04* (2013.01); *F23N 2033/08* (2013.01); *F23N 2035/06* (2013.01); *F23N 2037/12* (2013.01)

(58) Field of Classification Search
None
See application file for complete search history.

(56) References Cited

U.S. PATENT DOCUMENTS

| 4,363,785 A | 12/1982 | Willson | 422/173 |
|---|---|---|---|
| 4,495,873 A | 1/1985 | Blankenship | 110/250 |

(Continued)

FOREIGN PATENT DOCUMENTS

| EP | 0 529 368 | 12/1998 | ............. F23D 14/18 |
|---|---|---|---|
| EP | 2 039 995 | 3/2009 | ............. F23C 99/00 |

(Continued)

OTHER PUBLICATIONS

Fordscorpio.co.uk, "Catalytic Converter," 3 pages, Aug. 3, 2005, http://www.fordscorpio.co.uk/cats.htm.

(Continued)

*Primary Examiner* — Neil N Turk
(74) *Attorney, Agent, or Firm* — Sunstein Kann Murphy & Timbers LLP (57) ABSTRACT

A controller monitors oxygen levels in a bio-fuel fired device and automatically controls dampers, blowers and the like to reduce generation of smoke or other pollutants, thereby promoting proper operation of a catalytic converter.

9 Claims, 5 Drawing Sheets

(51) Int. Cl.
*F23N 5/02* (2006.01)
*F23N 5/00* (2006.01)
B01D 53/94 (2006.01)
G05B 11/00 (2006.01)
F23G 7/00 (2006.01)

(56) References Cited

U.S. PATENT DOCUMENTS

| | | | |
|---|---|---|---|
| 4,582,044 A | 4/1986 | Ferguson et al. | 126/289 |
| 5,497,617 A | 3/1996 | Bagley et al. | 60/274 |
| 5,499,622 A | 3/1996 | Woods | 126/500 |
| 5,822,978 A | 10/1998 | Streit et al. | 60/274 |
| 6,237,587 B1 | 5/2001 | Sparling et al. | 126/500 |
| 7,878,300 B2 | 2/2011 | Sammut et al. | 181/249 |
| 2001/0029004 A1 | 10/2001 | Sparling et al. | 431/326 |
| 2005/0112043 A1 | 5/2005 | Sparling et al. | 423/210 |
| 2006/0157047 A1 | 7/2006 | Tiegs | 126/77 |
| 2007/0114296 A1 | 5/2007 | Walborn | 237/2 |
| 2007/0250215 A1* | 10/2007 | Jia | G05B 13/048 700/274 |
| 2008/0039975 A1 | 2/2008 | Haga et al. | 700/274 |
| 2009/0050129 A1 | 2/2009 | Robinson, Jr. | 126/19 R |
| 2011/0247533 A1 | 10/2011 | Haas et al. | 110/216 |
| 2011/0300494 A1 | 12/2011 | Masen et al. | 431/12 |
| 2012/0048158 A1 | 3/2012 | Grace et al. | 110/203 |
| 2012/0116589 A1 | 5/2012 | Schneider et al. | 700/274 |

FOREIGN PATENT DOCUMENTS

| | | | |
|---|---|---|---|
| FR | 2 939 870 | 6/2010 | F24B 1/18 |
| WO | WO 00/08390 | 2/2000 | F24B 5/02 |
| WO | WO 2009/144393 | 12/2009 | B01D 53/86 |
| WO | WO 2010/075580 | 7/2010 | F23D 14/00 |

OTHER PUBLICATIONS

Custom Fireplaces & More, "Catalytic or Non-Catalytic?," 5 pages, 2010, http://www.customfireplacesandmore.com/40/catalytic-non-catalytic.html.

SHT Heiztechnik aus Salzburg, "Fully Automatic Combi-Boiler for Wood-Pellets and Logwood 4, 5-25, kW," 8 pages, 2006, www.sht.at/fileadmin/user_upload/TDA_Prospekt-ENG_F10-1.pdf.

International Searching Authority, Invitation to Pay Additional Fees and, Where Applicable, Protest Fee for International Application No. PCT/US2011/059480, 8 pages, dated Apr. 26, 2013.

International Searching Authority, International Search Report—International Application No. PCT/US2011/059480, together with the Written Opinion of the International Searching Authority, 17 pages, dated Aug. 16, 2013.

* cited by examiner

FIG. 5

INTELLIGENT OXYGEN LEVEL CONTROLLER FOR BIOFUEL-FIRED BURNER

CROSS-REFERENCE TO RELATED APPLICATIONS

This application is a divisional of U.S. patent application Ser. No. 13/290,082, filed Nov. 5, 2011, titled "Intelligently-Controlled Catalytic Converter for Biofuel-Fired Boiler" (now U.S. Pat. No. 8,812,162), the entire contents of which are hereby incorporated by reference herein, for all purposes. This application claims the benefit of U.S. Provisional Patent Application No. 61/410,598, filed Nov. 5, 2010, titled "Intelligently-Controlled Catalytic Converter for Biofuel-Fired Boiler," the entire contents of which are hereby incorporated by reference herein, for all purposes.

TECHNICAL FIELD

The present invention relates to controllers for bio-fuel fired devices and, more particularly, to controllers that monitors oxygen levels in bio-fuel fired devices and automatically control air handlers, such as dampers or blowers, that supply air to the bio-fuel fired devices to reduce generation of smoke or other pollutants and, thereby, promote proper operation of catalytic converters.

BACKGROUND ART

US Environmental Protection Agency (EPA) regulations limit the amount of particulate matter, measured in grams per hour, that may be emitted by a wood oven, wood stove, pellet stove or wood-fired boiler. Pollution control devices (PCDs), such as catalytic converters, are frequently used to clean wood-fired exhaust. A catalytic converter essentially burns unburned fuel and gases (smoke) from the fire before it exits through a flue (stack). However, conventional catalytic converters require careful monitoring and manual adjustment, such as utilizing them only after they have reached catalytic ignition temperature (between about 350° F. and about 600° F.). Some wood-fired devices employ damper(s) and fan(s) to transfer oxygen to facilitate the combustion of bio-fuel. However, dampers and fans generally should not be opened or operated until a pollution control device reaches operating temperature, so the catalytic converter can be switched into service. Manually monitoring and controlling a wood-fired device and its associated catalytic converter is inconvenient and can lead to inefficient operation and, in some cases, clogging of the catalyst-based pollution control device. Some devices also provide manual bypass modes, which do not control emissions during start up and fuel reload operations.

SUMMARY OF EMBODIMENTS

An embodiment of the present invention provides a controller for coupling to a pollution control device (PCD) that is configured to combust unburned material resulting from a bio-fuel fire. The controller includes a processor configured to receive a PCD temperature signal. The PCD temperature signal indicates a temperature related to temperature of the PCD. The processor is also configured to receive a heat call signal indicating a call for heat to be generated by the bio-fuel fire. The processor is further configured to automatically generate a PCD heater control signal. The PCD heater control signal is configured to cause operation of a heater, other than the bio-fuel fire. The heater is configured to heat the PCD. The PCD heater control signal is generated if the heat call signal is received and the PCD temperature signal indicates the temperature of the PCD is below a PCD operating temperature.

An air handler, such as a damper and/or a blower or a set of dampers and/or blowers, an air injector, a draft inducer or the like, may be configured to supply air to the bio-fuel fire. The processor may be configured to automatically prevent operation of the air handler, unless the PCD temperature signal indicates the temperature of the PCD is at least equal to a predetermined value, such as the PCD operating temperature or a temperature at least equal to, i.e., greater than or equal to, the PCD operating temperature.

An air handler control signal may be configured to cause operation of the air handler. The processor may be configured to automatically generate the air handler control signal, such that the air handler control signal is generated if the PCD temperature signal indicates the temperature of the PCD is at least equal to the PCD operating temperature.

The processor may be configured to automatically generate the air handler control signal so as to cause the air handler to cease operation, or to reduce an amount of air supplied to the bio-fuel fire, if the PCD temperature signal indicates the temperature of the PCD is below a predetermined value.

The controller may include the PCD and the heater. The PCD may include a catalytic converter, and the heater may include a resistive electric heater disposed proximate the PCD.

The processor may be configured to receive an oxygen level signal indicating an amount of oxygen in exhaust gas from the bio-fuel fire. The processor may be further configured to automatically generate an air handler control signal configured to cause operation of the air handler, such that the air handler increases the supply of air to the bio-fuel fire if the oxygen level signal indicates less than a first predetermined amount of oxygen in the exhaust gas. The first predetermined amount of oxygen may be in a range of about 3-4% downstream of the PCD or in a range of about 9-13% upstream of the PCD.

The processor may be further configured to automatically generate the air handler control signal, such that the air handler decreases the supply of air to the bio-fuel fire if the oxygen level signal indicates more than a second predetermined amount of oxygen in the exhaust gas. The second predetermined amount of oxygen may be in a range of about 3-4% downstream of the PCD or in a range of about 9-13% upstream of the PCD.

The processor may be configured to receive an exhaust temperature signal indicating a temperature of exhaust gas from the bio-fuel fire. The processor may be further configured to automatically generate the air handler control signal, such that the air handler increases the supply of air to the bio-fuel fire if the exhaust temperature signal indicates the exhaust gas is less than a predetermined temperature. The predetermined temperature may be about 213° F. Optionally or alternatively, the processor may be configured to automatically calculate a temperature at which moisture is exhausted by the exhaust gas from the bio-fuel fire and set the predetermined temperature to the calculated temperature.

The processor may be configured to receive an exhaust temperature signal indicating a temperature of exhaust gas from the bio-fuel fire. The processor may be further configured to automatically generate the air handler control signal, such that the air handler control signal is generated for a predetermined amount of time (pulse the bio-fuel fire) if the exhaust temperature signal indicates the exhaust gas is less than a predetermined temperature. The predetermined temperature may be about 200° F., such as for tight, efficient bio-fuel fired devices, or higher, such as about 375-400° F. for leaky or less efficient devices.

Optionally, the processor may be further configured to automatically generate the air handler control signal if the exhaust temperature signal indicates the exhaust gas is less than the predetermined temperature and the air handler has not been operated for at least a predetermined amount of time.

The processor may be configured to automatically detect a low-fuel condition, based on frequency of operation of an air handler. For example, if pulses occur more frequently than typical, the processor may conclude the low-fuel condition exists.

The controller may also include a wireless transmitter coupled to the controller. The controller may be configured to send a message, via the wireless transmitter, if the controller detects the low-fuel condition.

The bio-fuel may be or include a solid fuel, such as wood or a wood product, such as wood pellets.

Another embodiment of the present invention provides a controller for coupling to a pollution control device (PCD). The PCD is configured to combust unburned material resulting from a bio-fuel fire. The controller includes a processor. The processor is configured to receive an oxygen level signal indicating an amount of oxygen in exhaust gas from the bio-fuel fire. The processor is also configured to automatically generate an air handler control signal. The control signal causes operation of an air handler that is configured to supply air to the bio-fuel fire. The air handler increases the supply of air to the bio-fuel fire if the oxygen level signal indicates less than a first predetermined amount of oxygen in the exhaust gas.

Another embodiment of the present invention provides a controller for coupling to a pollution control device (PCD). The PCD is configured to combust unburned material resulting from a bio-fuel fire. The controller includes a processor. The processor is configured to receive an oxygen level signal indicating an amount of oxygen in exhaust gas from the bio-fuel fire. The processor is also configured to automatically generate an air handler control signal. The control signal causes operation of an air handler that is configured to supply air to the bio-fuel fire. The air handler ceases supplying air to the bio-fuel fire if air handler the oxygen level signal indicates less than a first predetermined amount of oxygen in the exhaust gas and the oxygen level has remained less than the first predetermined amount for at least a predetermined amount of time.

Yet another embodiment of the present invention provides a controller for coupling to a pollution control device (PCD). The PCD is configured to combust unburned material resulting from a bio-fuel fire. The controller includes a processor. The processor is configured to receive an exhaust temperature signal indicating a temperature of exhaust gas from the bio-fuel fire. The processor is also configured to automatically generate an air handler control signal. The control signal is configured to cause operation of an air handler that is configured to supply air to the bio-fuel fire. The air handler increases the supply of air to the bio-fuel fire if the exhaust temperature signal indicates the exhaust gas is less than a predetermined temperature.

An embodiment of the present invention provides a computer program product for controlling a pollution control device (PCD) that is configured to combust unburned material resulting from a bio-fuel fire. The computer program product includes a tangible non-transitory computer-readable medium having stored thereon computer program code. The computer program code is configured to receive a PCD temperature signal. The PCD temperature signal indicates a temperature related to temperature of the PCD. The computer program code is also configured to receive a heat call signal indicating a call for heat to be generated by the bio-fuel fire. The computer program code is configured to automatically generate a PCD heater control signal that is configured to cause operation of a heater, other than the bio-fuel fire. The heater is configured to heat the PCD. The PCD heater control signal is generated if the heat call signal is received and the PCD temperature signal indicates the temperature of the PCD is below a PCD operating temperature.

The computer program code may be configured to automatically generate an air handler control signal configured to cause operation of an air handler. The air handler is configured to supply air to the bio-fuel fire. The air handler control signal is generated if the PCD temperature signal indicates the temperature of the PCD is at least equal to the PCD operating temperature.

The computer program code may be configured to receive an oxygen level signal indicating an amount of oxygen in exhaust gas from the bio-fuel fire. The computer program code may also be configured to automatically generate the air handler control signal, such that the air handler increases the supply of air to the bio-fuel fire if the oxygen level signal indicates less than a first predetermined amount of oxygen in the exhaust gas.

The computer program code may be configured to automatically generate the air handler control signal, such that the air handler decreases the supply of air to the bio-fuel fire if the oxygen level signal indicates more than a second predetermined amount of oxygen in the exhaust gas.

The computer program code may be configured to receive an exhaust temperature signal indicating a temperature of exhaust gas from the bio-fuel fire. The computer program code may be further configured to automatically generate the air handler control signal, such that the air handler increases the supply of air to the bio-fuel fire if the exhaust temperature signal indicates the exhaust gas is less than a predetermined temperature.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Embodiments of the present invention provide intelligent (computer-controlled) pollution control devices (PCDs) for bio-fuel fired devices, such as wood ovens, wood stoves, outdoor wood boilers (OWB) and the like, collectively referred to herein as bio-fuel fired devices. Bio-fuel here means a fuel that is in some way derived from biomass, including solid biomass, liquid fuels and bio-gases. Biomass, a renewable energy source, is biological material from living, or recently living, organisms, such as wood, waste, algae, (hydrogen) gas and alcohol fuels. Exemplary solid biofuels include wood and wood pellets. Bioethanol is an alcohol made by fermenting sugar components of plant materials; it is made mostly from sugar and starch crops. Some embodiments of the present invention may be used with conventional fossil fuels, such as coal, oil or oil-derived fuels. Thus, where appropriate, the term bio-fuel includes fossil fuels.

OWBs are known as good sources of heated water, without depending on foreign sources of fuel and without burning fossil fuel. However, as noted, particulate matter and harmful gases such as carbon monoxide produced by wood-burning devices pose problems, and manually-operated catalytic converters are inadequate to solve these problems.

Embodiments of the disclosed intelligently controlled catalytic converter automatically monitor various operating parameters, such as catalytic converter input temperature, catalytic converter output temperature, pre-catalyst oxygen level, post-catalyst oxygen level, ambient temperature, ambient humidity, ambient barometric air pressure, water jacket temperature, water jacket inlet temperature and water jacket outlet temperature, of bio-fuel fired devices and automatically control electric heaters, dampers, blowers or other components in the devices. As a result, the devices operate more cleanly and efficiently than prior art bio-fuel fired devices.

Some embodiments of the present invention control a heater configured to bring a catalytic converter up to operating temperature (catalytic ignition temperature ("activation temperature"), such as between about 350° F. and about 600° F.). In most such embodiments, the heater includes a resistive electric heater; however, other types of heaters, such as propane-fired, microwave or infrared heat lamp heaters, may be used. Some embodiments prevent major, or in some cases any, burning of bio-fuel until the catalytic converter reaches operating temperature. For example, some embodiments prevent opening a damper or a fan that permits air to enter a fire box until the catalytic converter reaches operating temperature. Some embodiments prevent ignition of a fire in the fire box or other burning apparatus until the catalytic converter reaches operating temperature.

It is well known that conventional bio-fuel fired appliances equipped with conventional catalytic converters emit undesirably high levels of smoke and other pollutants during cold starts, i.e., before the catalytic converters reach operating temperature, because the catalytic converters are too cold to operate effectively. The above-described embodiments pre-heat a catalytic converter, so it is ready to operate effectively before a bio-fuel fire generates significant quantities (or, in some embodiments, any) smoke.

Some embodiments measure the temperature of the catalytic converter and control the heater based on the catalytic converter's temperature. Some embodiments measure additional or other quantities, such as stack temperature, and control the heater based on the measured quantities.

Some embodiments of the present invention control damper(s) and/or fan(s), based on measured quantities, to operate bio-fuel fired device efficiently and/or to reduce generation of smoke or other pollutants. We found that properly controlling the amount of oxygen in a fire box causes bio-fuel to be burned relatively cleanly and relatively efficiently. We discovered that, once a fire is established, between about 3% and about 4% excess oxygen (i.e., oxygen in flue gas downstream from the catalytic converter) is optimal. We discovered that less than about 3% excess oxygen starves the fire of oxygen and produces large quantities of smoke as the fire dies out. On the other hand, we discovered that more than about 4% excess oxygen causes the fire to rage, which consumes fuel at a high rate and causes much of the heat generated by the fire to be exhausted out the flue, rather than being captured by a water jacket or other heat transfer mechanism. In other words, operating with too little excess oxygen is dirty, whereas operating at too high an excess oxygen level is inefficient, in term of heat capture. Different bio-fuel fired devices may have different optimum values of excess oxygen. These optimum values may be empirically determined.

Similarly, we have found that providing sufficient oxygen to a catalytic converter is important to effective operation of the catalytic converter. The amount of oxygen required by the catalytic converter varies depending on several factors, largely the amount of smoke to be combusted. We discovered that at least about 3-4% excess oxygen indicates that gases entering the catalytic converter have sufficient oxygen to support secondary combustion by the catalytic converter.

Some embodiments measure oxygen level at one or more locations within a bio-fuel device and control damper(s) and/or fan(s) to maintain the excess oxygen level within a predetermined range, such as about 3-4%. We found that oxygen levels of about 9-13% upstream of a catalytic converter usually lead to excess oxygen levels of about 3-4%.

These and other embodiments are described in more detail below.

Intelligent Controller, Sensors and Controlled Devices

Figure 1:
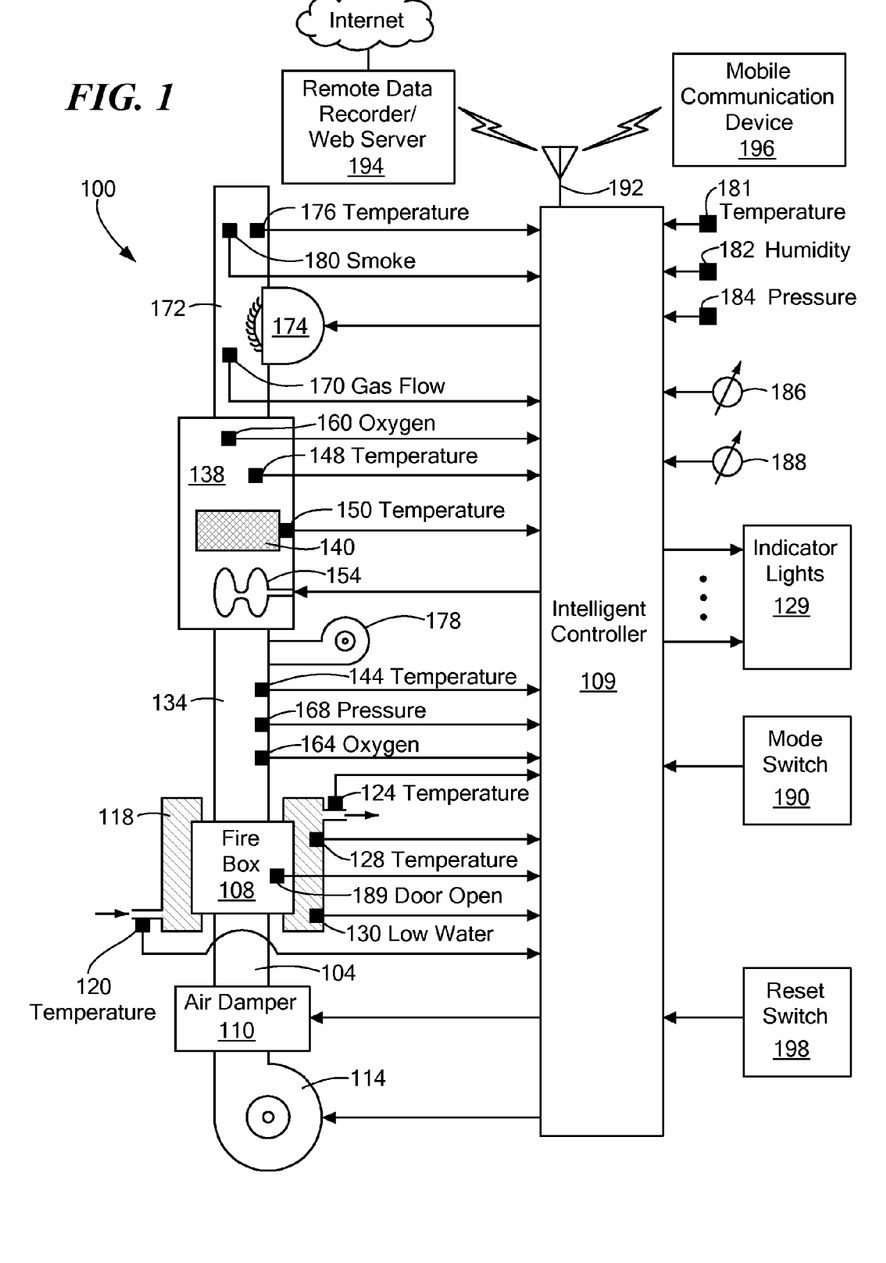
FIG. 1 is a schematic block diagram of a bio-fuel fired boiler, an intelligent bio-fuel controller (IBC) and a catalyst-based pollution control device (PCD) that is controlled by the IBC, according to an embodiment of the present invention.

FIG. 1 is a schematic block diagram of one illustrative embodiment of the present invention. A bio-fuel fired device 100 has an air inlet 104 to provide oxygen for a fire within a fire box 108. In some cases, bio-fuel is placed in the fire box 108, either manually or by an automatic mechanism, such as an auger, and the bio-fuel burns in the fire box 108. In other cases, commonly referred to as wood gas generators or "gasification units," bio-fuel is heated in one chamber to release volatile gases therefrom, and the gases flow into a subsequent chamber where they burn. However, for simplicity of explanation, we use the term fire box 108 to mean all such cases, unless the context indicates otherwise. Various sensors and controlled devices are disposed within the bio-fuel fired device 100, as described below. These sensors and controlled devices are coupled to an intelligent controller 109, also as described in more detail below.

A controllable damper 110 controls the amount of air permitted to enter the air inlet 104. The controllable damper 110 may be binary, in that the damper 110 may be either fully open or fully closed. Optionally or alternatively, the controllable damper 110 may include a set of binary dampers that progressively open to permit progressively more air to enter the air inlet 104. Optionally or alternatively, the controllable damper 110 may include a variable vane to control (in steps or infinitely) the amount of air that enters the air inlet 104. Optionally, a controllable blower 114 drives ambient air through the damper 110 into the fire box 108. The blower 114 may be a fixed-speed or a variable-speed blower. Optionally or alternatively, a set of progressive blowers may be used. For simplicity of explanation, the terms damper and blower refer to either a single or a staged damper or blower, as the case may be.

A water jacket or air jacket (for simplicity collectively referred to herein as a water jacket 118) may surround at least a portion of the fire box 108 or another portion of the device 100 to heat water or air in the jacket 118 from the fire. The heated water or air may be used directly or indirectly to cook food, roast coffee beans, heat a dwelling, meet domestic hot water needs or for another purpose. In some cases, no jacket 118 surrounds the fire box 108. Instead, radiant or conductive heat from the fire box 108 is used directly, such as to cook food, roast coffee beans, etc.

The water jacket 118 may be equipped with one or more sensors. For example, an inlet temperature sensor 120 and an outlet temperature sensor 124 may sense temperatures of water flowing into and out of the jacket 118. The temperature sensors 120 and 124 may be thermistors, thermocouples, infrared temperature sensors or other suitable temperature sensors. The return temperature may be used by the intelligent controller 109 to anticipate a demand for heat and, in response, begin or accelerate the combustion process, in order to level out the heating cycle and keep the water jacket temperature from falling rapidly. For example, if the difference in temperatures between the inlet temperature sensor 120 and the outlet temperature sensor 124 is greater than about 20° F., the intelligent controller 109 may open the damper 110 and/or operate the blower 114. The return temperature may also be used by the intelligent controller 109 to calculate a delta heat loss or use. The return temperature may be compared to the inlet temperature to calculate demand, BTU consumption and, when combined with a time stamp, the intelligent controller 109 may learn heating use patterns and times or days of the week that the unit is typically idle.

A temperature sensor 128, such as an aquastat, thermistor or thermocouple, may be attached to the water jacket 118 in a well-known manner. When the water jacket temperature falls below a set point, such as about 175° F., a conventional boiler controller would open the air damper 110 and operate the blower 114 to burn fuel to heat the water. However, as noted, starting or resuming the fire while the catalyst is still below its operating temperature may cause problems, as described above.

A low water level sensor 130 may be disposed within the water jacket 118. A low water condition may cause the intelligent controller 109 to illuminate a warning indicator among the indicator lights 129 and close the air damper 110 and cease operating the blower 114, so as to extinguish the fire and prevent damage to the fire box 108 or water jacket 118.

Figure 2:
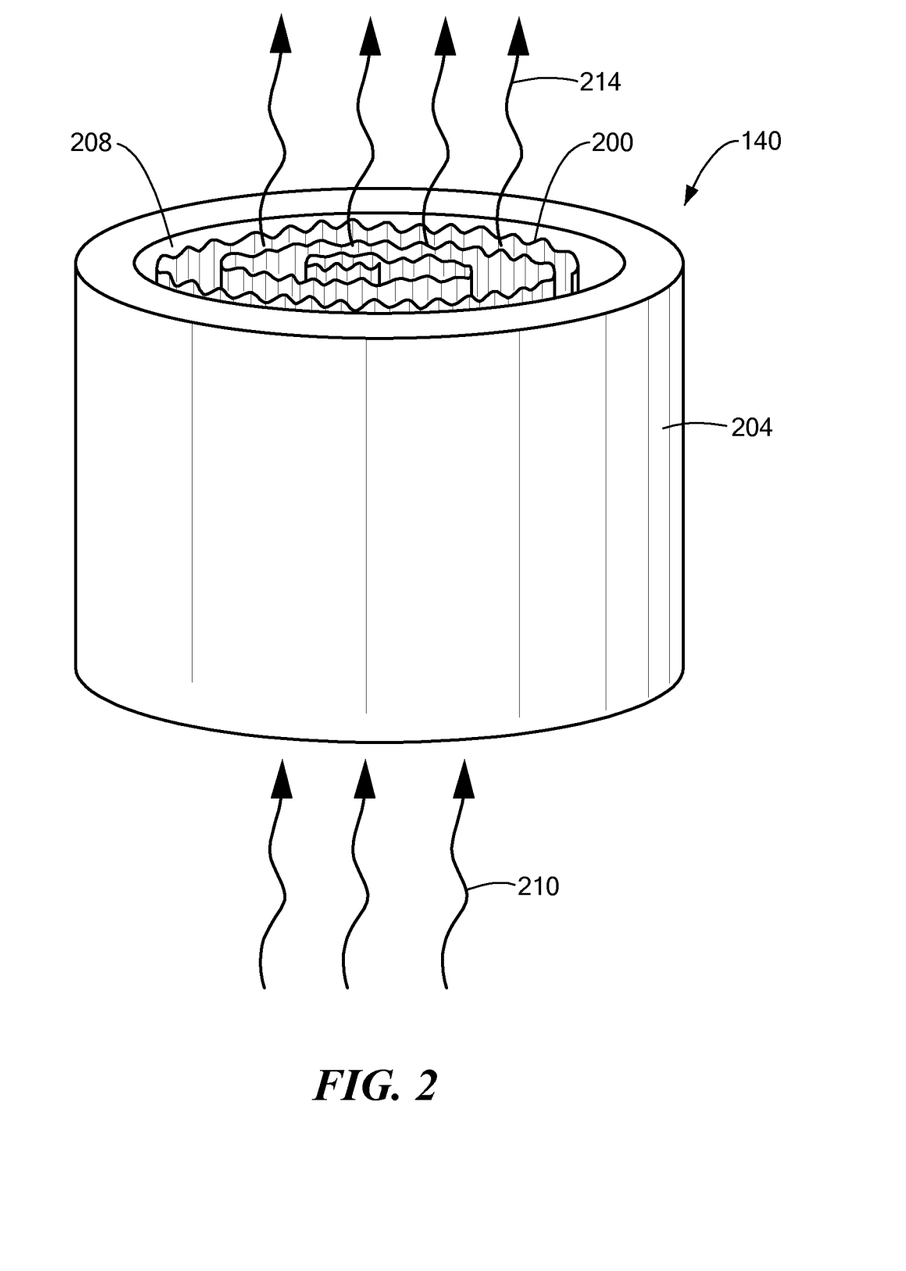
FIG. 2 is a perspective side view of the catalyst-based pollution control device of FIG. 1.

Exhaust from the fire box 108 exits, typically via a flue 134, and enters a pollution control device 138, where it passes through or over a catalyst 140. The catalyst 140 operates according to well-known chemical principles to combust at least a portion of unburned exhaust from the fire box 108. In some embodiments, as shown in FIG. 2, the catalyst 140 includes a thin, such as about 0.004 inch thick, ribbon 200 of suitable material, such as stainless steel, to which an appropriate catalyst material has been adhered. The ribbon 200 may be corrugated or formed into a "herringbone" pattern to increase its surface area and wound into a spiral and bound by a band 204. The band 204 defines a top opening 208 and a bottom opening (not visible). Smoke and other gases enter the catalyst 140 via the bottom opening, as indicated by arrows 210, and exit the catalyst via the top opening 214. A suitable catalytic material is available from Catalytic Combustion Corporation, 709 21st Avenue, Bloomer, Wis. 54724.

Returning to FIG. 1, the pollution control device 138 includes one or more temperature sensors, such as temperature sensor 144 at an input port of the pollution control device 138 and temperature sensor 148 at an output port. Optionally or alternatively, one of the two temperature sensors 144 or 148, or a third temperature sensor 150, may be directly attached to the catalytic converter 140 to obtain a more direct temperature of the catalyst. We have found that temperature sensors located above the catalytic converter 140 may sense temperatures as much as about 100-200° F. lower than the catalytic converter 140, due to cooling of gases as they flow through the stack 172. The stack 172 may be long, or ambient temperatures may be very low, leading to this cooling. Thus, the temperature sensor 150 may yield a more accurate catalyst temperature than the other temperature sensors 144 and 148.

Figure 3:
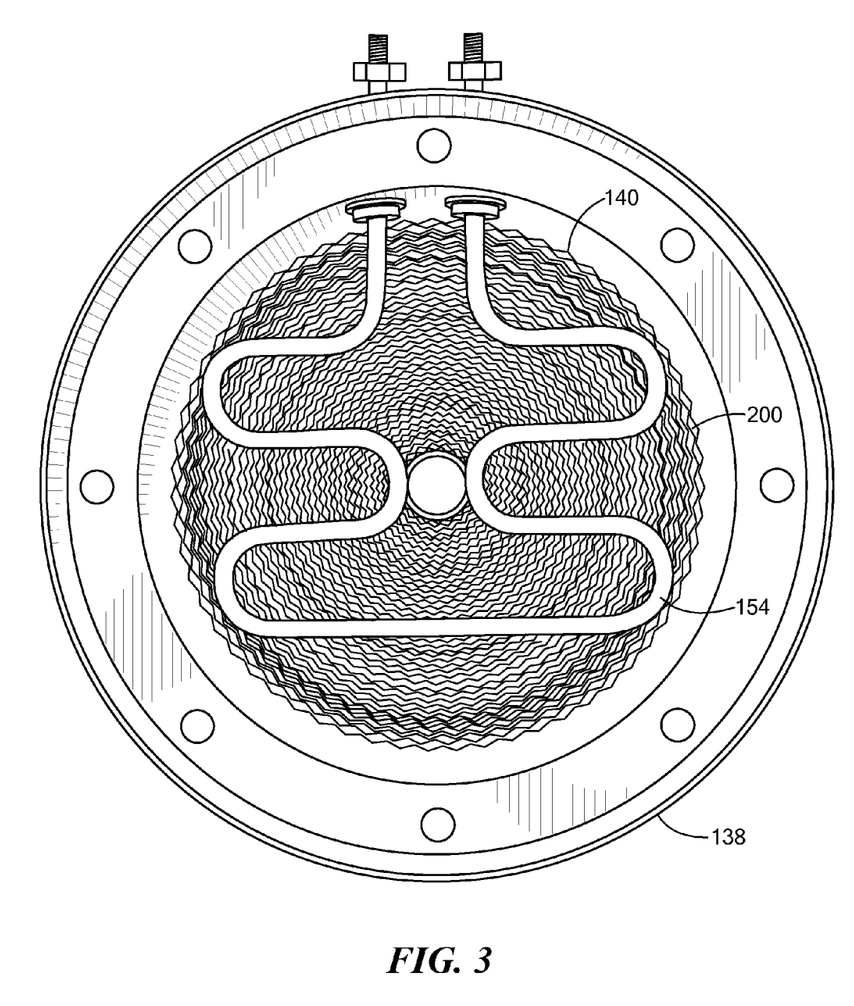
FIG. 3 is a bottom-of-stack view of the pollution control device of FIG. 1.

The pollution control device 138 includes a suitable heater 154 located below or otherwise adjacent the catalyst 140. In one embodiment, a 900-1100 watt resistive electric heater is used. FIG. 3 is a bottom view of the heater 154 installed below the catalyst 140. Optionally or alternatively, another suitable type of heater may be used, such as an infrared lamp, a propane-fired heater or a microwave heater.

Returning again to FIG. 1, an oxygen sensor 160 may be disposed above the catalytic converter 140. An additional oxygen sensor 164 may be disposed below the catalytic converter 140. These two sensors 160 and 164 enable the intelligent controller 109 to ascertain the amount of oxygen consumed by the catalytic process by subtracting the oxygen level sensed by the upper oxygen sensor 160 from the oxygen level sensed by the lower oxygen sensor 164. The amount of oxygen in gas upstream of the catalytic converter 140, i.e., between the fire box 108 and the catalyst 140, is referred to as "pre-catalyst" oxygen level, and the amount of oxygen in gas downstream of the catalytic converter 140, i.e., between the catalyst 140 and the top of the stack 172, is referred to as "post-catalyst" oxygen level. Similarly, pre-catalyst temperature and post-catalyst temperature refer to temperatures upstream and downstream of the catalyst 140, respectively.

A pressure sensor 168, located below the pollution control device 138, enables the intelligent controller 109 to detect back pressure, such as back pressure that may be caused by a clogged catalytic converter 140. Similarly, insufficient gas flow, detected by a gas flow sensor 170, may indicate the catalyst 140 is clogged. In either case, the intelligent controller 109 may raise an alarm to indicate that maintenance is needed. In response to detecting insufficient gas flow in the flue/stack 172, the intelligent controller 109 may also activate a draft inducer 174, open or further open the damper 110, operate or speed up the blower 114 or adjust operation of some other controlled device.

A top-of-stack temperature sensor 176 detects the temperature of gases exiting the stack 172. An air injector 178 may be operated by the intelligent controller 109 to inject oxygen into the flue 134 or directly into the pollution control device 138. A smoke detector 180 may be installed at or near the top of the stack 172 to detect presence of smoke. The smoke detector 180 may be of any suitable type, such as optical or ionization.

Various ambient condition sensors, such as an ambient temperature sensor 181, an ambient humidity sensor 182 and an ambient barometric pressure sensor 184, may be coupled to the intelligent controller 109 to provide information about ambient conditions. Set point temperature controls, such as a water jacket set point temperature control 186 and a room set point temperature control (thermostat) 188, may also be coupled to the intelligent controller 109. A fire box door open switch 189 may be coupled to the intelligent controller 109. A mode switch 190 (described in more detail below) may also be coupled to the intelligent controller 109.

The intelligent controller 109 may be coupled to a suitable wireless transmitter and antenna 192 to enable the intelligent controller 109 to send information, such as to a remote data recorder 194 and/or a mobile communication device 196, such as a mobile telephone.

The intelligent controller 109 performs its functions by executing computer instructions stored in a memory, which may be part of or separate from the controller 109. As a result of executing these instructions, the intelligent controller 109 reads values from the sensors, switches, controls, etc. (collectively referred to herein as sensors) and controls operation of the dampers, blowers, etc.

Figure 4:
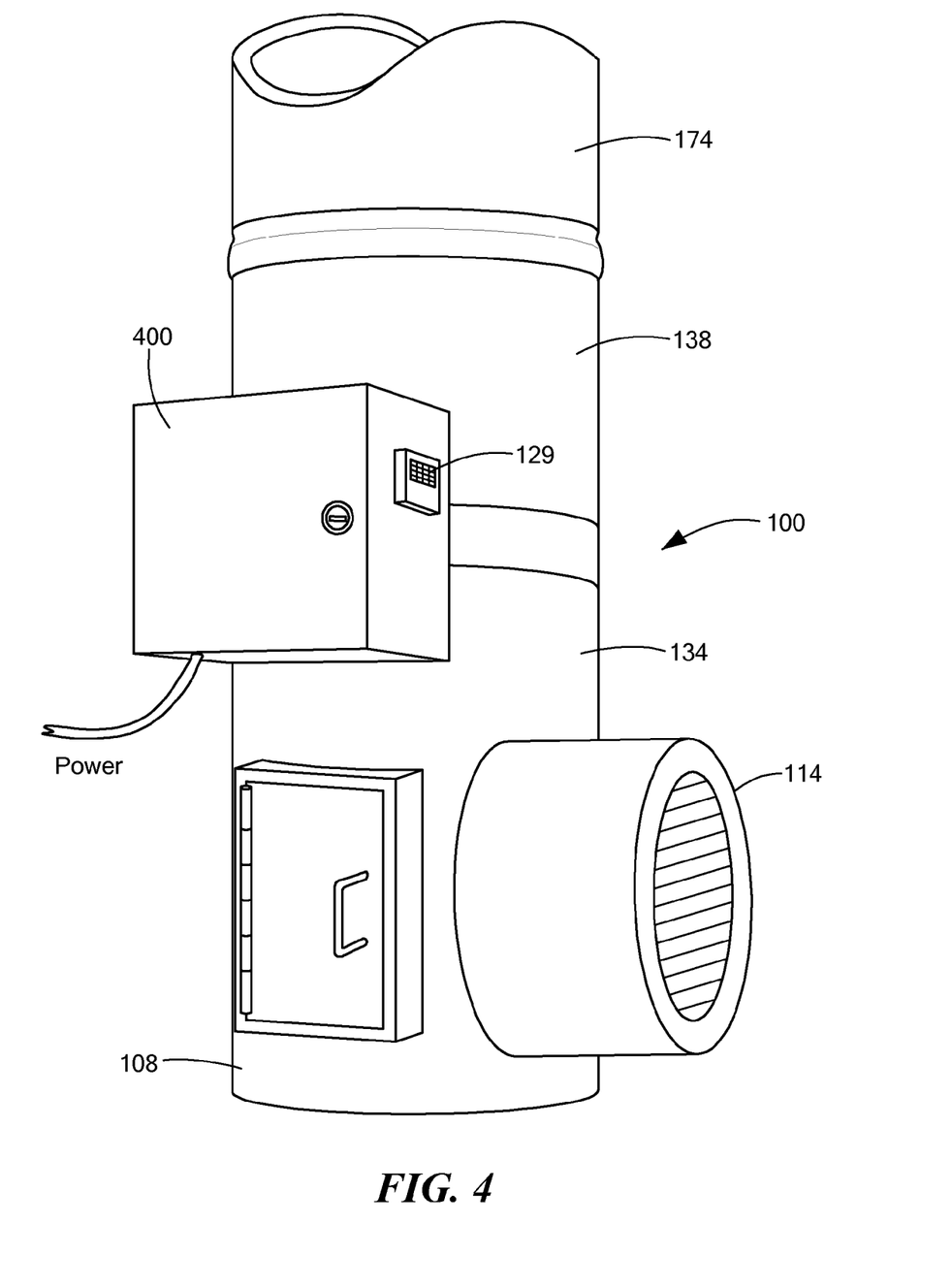
FIG. 4 is a perspective side view of the intelligent bio-fuel controller attached to a flue and a bio-fuel fired device, as in the embodiment of FIG. 1.

In some embodiments, as shown in FIG. 4, the intelligent controller 109 and, optionally, some of the switches and/or controls are enclosed in a housing 400 that may be attached to the flue 134 of a bio-fuel fired device 100. In other embodiments (not shown), the intelligent controller 109, or a circuit that implements a subset of the functionality of the intelligent controller 109, is provided in a housing, with or without the pollution control device 138, but without the fire box 108, air damper 110, etc. In yet other embodiments (not shown), the pollution control device 138, including the catalytic converter 140 and the heater 154 and, optionally, one or more sensors, is provided, absent the intelligent controller 109, fire box 108, air damper 110, etc. In other words, various embodiments may include packages of various combinations of the items described herein.

Returning again to FIG. 1, according to some embodiments of the present invention, when the water jacket temperature falls below the set point, if the catalyst 140 is below its minimum activation temperature (as indicate by the catalytic converter temperature sensors 150, 148 and/or 144), the intelligent controller 109 operates the heater 154, until the catalyst 140 reaches its minimum activation temperature. The minimum activation temperature of the catalyst 140 depends on the construction and composition of the catalyst 140. A typical minimum activation temperature for some common catalysts is about 350° F.

While the catalyst 140 is being electrically heated, the intelligent controller 109 does not open the air damper 110 or operate the blower 114. That is, opening the air damper 110 and operating the blower 114 are delayed until the catalyst 140 reaches a predetermined temperature. Once the catalyst 140 reaches the first predetermined temperature, such as about 450° F. or about 100-150° F. above the activation temperature, the intelligent controller 109 opens the air damper 110 and allows heated air from the fire box 108 to move to the catalyst 140. This stage is called a Pre-Heat Stage. Many cooking and heating devices are air tight, and opening their dampers allows air heated by the heater 154 to rise to the catalyst 140. Next, the controller enters a Boost Stage.

When the catalyst 140 reaches a second predetermined temperature, such as about 600° F., the intelligent controller 109 operates the blower 114. Consequently, the catalyst 140 is not subjected to smoke until it has reached its minimum operating temperature. Optionally, the electric heater 154 may continue to be operated to further heat, or to maintain the temperature of, the catalyst 140, even after the air damper 110 is opened and while the blower 114 is operated. This can be influenced by ambient temperature. If the damper 110 and blower 114 are pushing cold air, such as below about 0° F., into the fire box 108, the catalyst 140 can be cooled, if the fired box 108 is cold. This is often the case during a cold start and during or after a fuel reload.

If, however, the catalytic converter 140 is already (or still) at or above its minimum operating temperature and the water jacket 118 temperature falls below the set point, the intelligent controller 109 may open the air damper 110 and operate the blower 114 without delay.

Even while a fire actively burns in the fire box 108, such as during a call for heat, the catalyst 140 may cool down, such as on very cold days or when the damper 110 is first opened and the blower 114 is operated, but before the fire in the fire box 108 has reached a sufficient heat intensity. This often occurs during a cold start or fuel reload. While the damper 110 is open or the blower 114 is operating, if the catalyst temperature falls below a predetermined value, such as its minimum operating temperature or another predetermined value above or below the minimum operating temperature, such as about 450° F., the intelligent controller 109 may operate the electric heater 154 to further heat, or maintain the temperature of, the catalyst 140. Optionally, the intelligent controller 109 may also close the air damper 110 and/or cease operating the blower 114 until the catalyst 140 reaches another predetermined temperature. Note that closing the air damper 110 and/or ceasing operation of the blower 114 may be done in stages. Thus, the air damper 110 may be partially closed and the speed of the blower 114 may be reduced. Similarly, if several air dampers 110 and/or blowers 114 are operated in parallel (staged), a portion of the air dampers may be closed or a portion of the blowers may be shut down.

Optionally or alternatively, other measured parameters may be used by the intelligent controller 109 to determine when to open the air damper 110, operate the blower 114 and or operate the electric heater 154. In some embodiments, ambient temperature, humidity and/or barometric air pressure (as measured by sensors 181-184) may be used as part or all of this determination. In one embodiment, if the ambient temperature is below a predetermined value, such as about 0° F., the intelligent controller 109 may further delay opening the air damper 110 and operating the blower 114, thereby heating the catalyst 140 to a temperature greater than the minimum operating temperature, on the assumption that an inrush of cold air would reduce the catalyst temperature below its minimum operating temperature.

The temperature (above the minimum operating temperature discussed above) to which the catalyst 140 is raised before opening the damper 110 and operating the blower 114 may depend on, such as being proportional to, the amount by which the ambient temperature is below the predetermined value (such as about 0° F.). For example, for each degree of ambient temperature below 0° F., the catalyst 140 may be heated one additional degree above its minimum operating temperature. Similarly, a relatively high humidity level may cause the intelligent controller 109 to further delay opening the air damper 110 and operating the blower 114. For example, if the relative humidity is higher, the catalyst 140 may be heated more, by an amount proportional to the relative humidity or by an amount by which the relative humidity exceeds a predetermined value.

Optionally, if the catalyst 140 exceeds a predetermined temperature, such as about 1,600° F., the intelligent controller 109 closes the air damper 110 and ceases operating the blower 114. Once the catalyst 140 has cooled sufficiently, i.e., reached a safe operating temperature, the intelligent controller 109 may again open the air damper 110 and operate the blower 114, if needed to maintain the water jacket 118 temperature according to its set point.

Catalysts typically require a minimum amount of oxygen to operate. Optionally, the air injector (fan or blower) 178 may be included to inject air into the input gas stream to the catalytic converter 140. The oxygen sensor(s) 164 and/or 160 may sense the concentration of oxygen in flue gases passing into or out of the catalytic converter 140. If the concentration of oxygen is below a predetermined value, such as about 3% above the catalyst 140, the intelligent controller 109 may operate the air injector 178 to introduce oxygen-containing air into the stream.

Some United States states, such as New Jersey, have regulations that do not permit visible emissions from outdoor hydronic heaters/OWBs for more than three minutes within a thirty minute period. Large amounts of smoke might be exhausted as a result of any of several situations, including a raging fire or the fire box 108 having been loaded with a large quantity of fuel, a large quantity of small pieces of fuel with a large collective surface area or wet or green fuel. In such a situation, when the oxygen level above the catalyst 140 is below a (possibly variable) set point (indicating smoke production), the intelligent controller 108 may close the dampers 110 and cease operating the fans 114 to prevent the smoke from leaving the flue 172. As noted, the smoke detector 180 at the top of the stack 172 may be used to detect smoke being exhausted by the device 100.

The catalytic converter 140 and the intelligent controller 109 may be constructed as part of a biofuel-fired device or as an add-on to the device. An OWB may also be constructed using the intelligent controller 109 to manage the combustion of the OWB. An OWB may be constructed so as to accept an add-on intelligent controller 109 later, such as when it becomes more economically advantageous to do so or after air quality regulations in a geographic area become more stringent.

State Machine Embodiment

In general, in some embodiments, the intelligent controller 109 may execute as a finite state machine, where at least some of the states correspond to stages we have identified in the operation of a well-managed bio-fuel fired device 100. Table 1 lists the primary states of such a state machine, according to some embodiments. Other embodiments may have more, fewer or different states. Exemplary states are described in more detail below the table.

Each state defines conditions necessary to change to at least one other state. For example, according to one embodiment, in the Preheat State, the heater 154 is operated to heat the catalyst 140. To progress from the Preheat State to the Boost State, the post-catalyst temperature needs to have reached a predetermined value (represented by a variable named Preheat_State_Cat_Min_Temp) and a predetermined amount of time (represented by a variable named Preheat_State_Cat_Min_Temp_Time) needs to have transpired during which the heater 154 has operated.

More than one condition may be specified for changing to another state. For example, in the Preheat State, if the post-catalyst temperature reaches a predetermined value (represented by a variable named Preheat_State_Cat_Esc_Temp), the state may be changed to the Boost State, even if Preheat_State_Cat_Min_Temp_Time time has not yet expired.

Each state may define one or more conditions under which control passes to an earlier state. For example, in the Run State, if the post-catalyst temperature drops to less than a predetermined temperature (represented by a variable named Run_State_Cat_Min_Temp) for at least a predetermined amount of time (represented by a variable named Run_State_Min_Temp_Time), then the catalyst heater 154 may be re-energized and the Boost State may be re-entered.

Each state may define one or more error conditions. For example, in the Preheat State, if a predetermined amount of time elapses (represented by a variable named Preheat_State_Max_Time) without the post-catalyst temperature reaching either predetermined value described above, it may be assumed that the fuel has been exhausted or some other condition prevents a fire from starting or resuming, and the intelligent controller 109 may de-energize the catalyst heater 154 and set Lockout State. Such a transition prevents, for example, burning out the heater 154 as a result of excess operation. Manual intervention, such as depression of the reset switch 198, may be required by the intelligent controller 109 before the Lockout State is allowed to be exited.

TABLE 1

| State Machine States |
| --- |
| Startup State |
| Preheat State |
| Reheat Stat |
| Boost State |
| Run State |
| O2 Recovery State |
| Idle State |
| Lockout_State |

Startup State—Energize catalyst heater 154, start the preheat state timer and set Preheat State.

Preheat State—If the post-catalyst temperature reaches Preheat_State_Cat_Min_Temp, and Preheat_State_Cat_Min_Temp_Time minutes have elapsed on the preheat state timer, then start the boost state timer, open the damper 110 and set the Boost State. If the post-catalyst temperature reaches Preheat_State_Cat_Esc_Temp, then start the boost state timer, open damper 110 and set the Boost State. If Preheat_State_Max_Time minutes have elapsed while the controller is operating in this Preheat State, then de-energize the catalyst heater 154 and set Lockout State. Lockout State may be entered if, for example, the burner is out of fuel and thus will not fire and reach an operating temperature, regardless of how long the damper 110 is open.

Reheat State—If the post-catalyst temperature reaches Reheat_State_Cat_Min_Temp and Reheat_State_Min_Temp_Time minutes have elapsed on the preheat state timer, then start the boost state timer, open the damper 110 and set the Boost State. If the post-catalyst temperature reaches Reheat_State_Ca_Esc_Temp, then start the boost state timer, open the damper 110 and set the Boost State. If the post-catalyst temperature drops to less than or equal to Reheat_Blower_Stop degrees, then de-energize the blower 114. If Reheat_State_Max_Time minutes have elapsed while the controller is operating in this Reheat State, then de-energize the catalyst heater 154, close the damper 110 and set Lockout State.

Boost State—If the post-catalyst temperature remains greater than or equal to Boost_State_Cat_Dwell_Temp, then wait for Boost_State_Dwell_Temp_Time minutes to elapse on the boost state timer and then energize the blower 114, start the run state timer and set Run State. If the post-catalyst temperature reaches Boost_State_Ca_Esc_Temp, then set Run State. If the post-catalyst temperature drops to less than or equal to Boost_State_Ca_Min_Temp, then start the reheat state timer and set the Reheat State.

Run State—If the post-catalyst temperature remains greater than or equal to Run_State_Cat_Dwell_Temp for Run_Stat_Dwell_Temp_Time, then de-energize the catalyst heater 154. If the post-catalyst temperature drops to less than or equal to Run_State_Cat_Min_Temp for Run_State_Min_Temp_Time, then energize the catalyst heater 154, start the boost state timer and set the Boost State.

Idle_State—If the controller is operating in Slave Mode, then energize the Call For Heat LED in the indicator lights 129 and set the Startup State. If the controller is operating in Master Mode, then open the damper 110 and energize the blower 114 for Blower_Exercise_Interval_Time per each Blower_Idle_Interval_Time time interval.

Lockout State—If the reset switch 198 is pressed for more than one second and then released, then extinguish the Lockout LED 129 and set the Idle_State.

Table 2 lists exemplary values for variables referenced in Table 1, as well as other variables that may be used.

TABLE 2

| Variables (One embodiment) | |
|---|---|
| Startup_State_Max_Time | 30 min. |
| Startup_State_Esc_Water_Jacket_Temp | 100° F. |
| Startup_State_Cat_Esc_Temp | 599° F. |
| Startup_State_Min_Time | 10 min. |
| Preheat_State_Cat_Min_Temp | 140° F. |
| Preheat_State_Cat_Min_Temp_Time | 5 min. |
| Preheat_State_Cat_Esc_Temp | 449° F. |
| Preheat_State_Max_Time | 60 min. |
| Preheat_State_O2_Esc | 6.5% |
| Reheat_State_Cat_Min_Temp | 446° F. |
| Reheat_State_Min_Temp_Time | 5 min. |
| Reheat_State_Cat_Esc_Temp | 449° F. |
| Reheat_Blower_Stop | 302° F. |
| Reheat_State_Max_Time | 60 min. |
| Reheat_Blower_Stop_Temp | 302° F. |
| Reheat_State_O2_Esc | 6.5% |
| Reheat_State_Lockout_Max_Time | 240 min. |
| Boost_State_Cat_Dwell_Temp | 527° F. |
| Boost_State_Dwell_Temp_Time | 2 min. |
| Boost_State_Cat_Esc_Temp | 653° F. |
| Boost_State_Cat_Min_Temp | 446° F. |
| Boost_State_O2_Esc | 6.5% |
| Run_State_Cat_Dwell_Temp | 599° F. |
| Run_State_Dwell_Temp_Time | 2 min. |
| Run_State_Cat_Min_Temp | 599° F. |
| Run_State_Min_Temp_Time | 60 min. |
| Run_State_O2_Esc | 5% |
| Run_State_Inducer_Min_Temp | 599° F. |
| Run_State_Inducer_Lockout_Cat_Temp | 1900° F. |
| Run_State_O2_Min_Value | 7% |
| Run_State_O2_Min_Time | 6 min. |
| O2_Recovery_State_Min_Value | 6.5% |
| O2_Recovery_State_Max_Time | 15 min. |
| O2_Recovery_State_Min_Cat_Temp | 140° F. |
| O2_Recovery_State_Min_Water_Jacket_Temp | 100° F. |
| O2_Recovery_State_Esc_Value | 6.5% |
| Blower_Exercise_Interval_Time | 20 min. |
| Blower_Idle_Cat_Temp | 446° F. |

TABLE 2-continued

| Variables (One embodiment) | |
|---|---|
| Blower_Idle_Cat_Esc_Temp | 599° F. |
| Blower_Idle_Interval_Time | 40 min. |

The values of variables shown in Table 2 are exemplary. For example, the values shown in Table 2 may be appropriate for intelligent controllers 109 used with older, less efficient, bio-fuel burning devices. Variable values for newer, more efficient, devices may be derived empirically. Nevertheless, the intelligent controller 109 may be described as controlling one or more aspects of the bio-fuel fired device 100, such as the heater 154 and the damper 110, based on rules. Various considerations for setting operating parameters will now be discussed. These considerations may be used, for example, to set or vary the variable values listed in Table 2, state transitions, etc.

The oxygen sensor 164 below the catalyst 140 may be used to determine if sufficient oxygen is available for the catalyst 140 to combust particulate matter and harmful gases. The amount of oxygen necessary may vary according by type of OWB and fuel used. Some acceptable pre-catalyst oxygen values lie between about 9% and about 13%. Acceptable ranges of pre-catalyst oxygen levels can also vary due to the stage of the combustion process. For example, the Pre-Heat State typically needs more oxygen that the Run State. These variables can also change based on the loading and re-loading of fuel. For example, when the fire box 108 is loaded full of fuel, less volume within the fire box 108 is available for air. Thus, a higher oxygen level may be necessary for efficient operation. If insufficient oxygen is detected, the intelligent controller 109 may open additional dampers 110 and/or turn on or pulse the blower 114 to add oxygen to the combustion process. Optionally or alternatively, the intelligent controller 109 may operate the air injector 178 and/or the draft inducer 174.

However, too much air flow volume or rate can be detrimental in several ways. Excess air velocity or flow rate (CFM) from the fan can push fly ash from the burning fuel into the catalyst 140, causing it to clog. High air flow rate can push heat out of the firebox 108 and the flue 172, thereby reducing efficiency of the device 100, which wastes fuel. To operate the catalyst 140 most effectively, smoke should pass over the catalyst 140 relatively slowly, i.e., there should be sufficient contact time ("residence time") between the smoke and the catalytic material. In addition, ambient air not consumed by the fire can cool the catalyst 140, thereby reducing the effectiveness of the catalyst.

On the other hand, if the damper 110 and/or the blower 114 is operating at maximum capacity, yet the detected oxygen level remains insufficient for a predetermined amount of time, such as about three minutes, the intelligent controller 109 may close the damper 110 and cease operation of the blower 114, at least for a predetermined amount time, on the assumption that the fire will recover or completely die out. In either case, while the damper 100 and blower 114 are not open or operating, smoke should not be emitted.

Automatic Adaptation to Ambient Conditions, State of Burning Device, etc.

Most current production OWBs are not designed for a post-combustion pollution control devices. Consequently, the damper 110, the blower 114 and/or the flue 134 may be inadequately sized to provide sufficient oxygen for both the fire in the fire box 108 and for the catalytic converter 140. In some cases, the blower 114 and/or the flue 134 may need to be replaced with larger units to provide sufficient oxygen. The pressure sensor 168 may be used to measure back pressure in the bio-fuel heater. Excess back pressure may cause creosote to be pushed out of dampers and fans, resulting in performance and maintenance issues with the heater over time. In addition, a buildup of volatile gases may cause an explosion. If the intelligent controller 109 detects excess pressure, which may be caused by such a buildup of volatile gas, the intelligent controller 109 may open the damper 110 and operate the blower 114 to combust or expel the gases.

Rated specifications for dampers, blowers, flue pipes, etc. are not always accurate. In addition, in many cases, these ratings should be reduced as a result of installation nonidealities. For example, protective housings placed over dampers or blowers may reduce their effective air handling capacities. However, often these adjustments are not made, and resulting systems are actually underconfigured. Furthermore, over time, the damper 110 and blower 114 may become less efficient, such as due to wear and tear or buildups of viscous lubricants that inhibit free movement of shafts, etc. In addition, over time, inside walls of the flue 134 and the stack 172 may become coated with residue, thereby reducing their effective cross-sectional area and gas handling capabilities. Furthermore, over time the fire box 108, its door and other components may develop air leaks. For example, gaskets around the fire box door may become compressed or worn, causing the device to become less air tight.

Thus, although a system may be thought to be well designed or well balanced when first installed, optimum operating parameters may never have been met or may change over time. The intelligent controller 109 senses various temperatures, etc., thus the intelligent controller 109 ascertains information about the system in its current (possibly compromised) state, and the intelligent controller 109 controls the dampers 110, blowers 114, etc. so as to achieve better results (cleaner and more efficient operation) than a system that is not automatically monitored and controlled. In other words, the intelligent controller 109 adjusts operation of the system as the system ages or in response to the installation of replacement parts or other maintenance performed on the system.

The door open sensor 189 enables the intelligent controller 109 to start a timer, and if the door remains open longer than a predetermined amount of time or the water jacket 118 temperature or the stack temperature 176 falls below a predetermined value, to sound an alarm, inasmuch as an open door can pose a safety problem, and extended door opening can decrease burner efficiency or cause the fire to rage.

The temperature sensor 176 at the top of the flue 172 may be used to monitor the temperature of gases leaving the stack 172 to insure moisture can escape. Biomass fuel typically includes some moisture, which can become trapped in the OWB. More efficient OWBs, such as units that employ gasification technology, typically produce lower temperature exhaust than less efficient units. If the exhaust gas has a temperature less than the boiling point of water at the ambient barometric pressure and relative humidity, the water can condense in the flue and run back down into the fire box and cause rust and other problems. As noted, the intelligent controller 109 may sense the ambient conditions using sensors 181-184. Alternatively, the intelligent controller 109 may assume some predetermined ambient conditions exist. If the intelligent controller 109 detects a stack-top temperature less than necessary, such as less than about 213° F., to drive out moisture, the intelligent controller 109 may open the damper 110, activate the blower 114, activate the draft inducer 174, activate the heater 154 or adjust other parameters to increase the intensity of the fire and, thereby, increase the exhaust exit temperature. Low stack temperature may also be used by the intelligent controller 109 to detect a low-fuel or out-of-fuel condition and notify a user or fuel supplier, as discussed herein.

Pulsing

As noted, in wood gas generators (gasification units), bio-fuel is heated in one chamber to release volatile gases, and the gases flow into a subsequent chamber where they burn. If such a unit is not called upon to generate heat for an extended period of time, such as several hours, the volatile gas can build up within the unit and potentially cause an explosion. In some embodiments, the intelligent controller 109 "pulses" the bio-fuel heater to prevent such a buildup of gas. That is, during an extended period during which the bio-fuel heater is otherwise idle, the damper 110 is opened and, optionally, the blower 114 is operated for about two minutes every about half hour. Each such pulse refreshes the fire and combusts or expels the excess volatile gas.

We discovered that pulsing is also beneficial in non-gasification units. For example, pulsing during what would otherwise be an idle period keeps the fire going and hot, whereas otherwise the fire is likely to smoke heavily and/or go out. Some bio-fuel fired units are called upon to generate heat only infrequently. Some bio-fuel fired units operate for relatively short periods of time, such as about an hour, when called upon to generate heat, and then the units sit largely idle for relatively long periods of time, such as four, six and sometimes ten hours. Starting up a conventional burner after such a long idle period would generate considerable smoke. However, pulsing such a unit prevents or reduces smoke generation.

We have found pulsing non-gasification units for about one minute about every hour, even in the absence of (and particularly in the absence of) calls for heat, refreshes the fire and keeps it hot. We discovered that pulsing consumes little fuel, yet pulsing keeps the fire hot enough to prevent smoking and keeps the catalytic converter 140 warm enough so the catalytic converter 140 can be brought to operating temperature by the heater 154 quickly (if it is even necessary to do so), thereby saving electricity. Furthermore, the device 100 can be brought up to an operating temperature and begin generating hot water, etc. quickly.

Although periodic pulsing provides the above-listed advantages, we have found that pulsing based on stack temperature, rather than based on time, provides additional advantages, as described below. A pulse should be initiated when the stack or other measured temperature falls to a predetermined value. We have found desirable temperatures at which pulses should be triggered depend on factors related to the unit being pulsed. Modern, tight, efficient units normally operate at lower temperatures than older, leaky, less efficient units. We found that triggering a pulse at about 200° F. in a relatively tight unit is desirable, whereas higher temperatures, about 375-400° F., are appropriate for less efficient units. Although hard-coded temperature values for triggering pulses may be used, an automatic method for determining the trigger temperature is described below.

Figure 5:
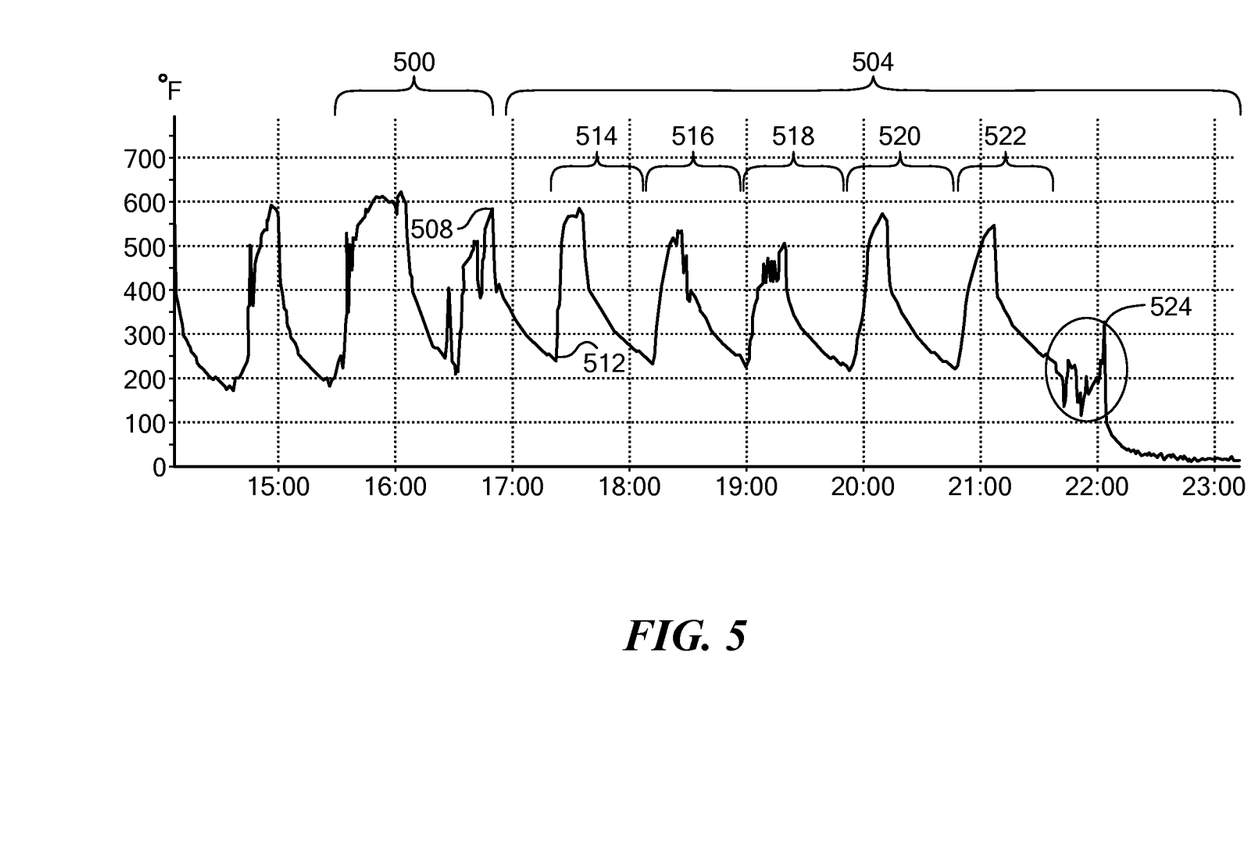
FIG. 5 is a graph showing hypothetical temperature data from a bio-fuel fired boiler controlled by the intelligent bio-fuel controller of FIG. 1.

FIG. 5 is a hypothetical graph of temperature detected by the sensor 148 above the catalytic converter 140. The graph of FIG. 5 is based on actual experiments we conducted on bio-fuel fired burners equipped with embodiments of the intelligent controller 109. We have conducted many experiments with a large number of bio-fuel fired units, and we found this graph to be representative, although the pulse trigger temperature may vary, as discussed above. During time period 500, the bio-fuel fired device under test was called on to generate heat at various times, as evident from the irregular fluctuations in temperature. However, during time period 504, the device was idle, and operation and some advantages of pulsing can be seen.

At 508 the last call for heat ended, and the damper 110 was closed and the blower 114 ceased operation. As a result, the fire dwindled, and the temperature decreased. At 512, once the temperature fell below a low temperature limit, the intelligent controller 109 initiated a pulse, which refreshed the fire and caused the temperature to increase. The temperature eventually decreased later in the interval 514. This process was repeated for pulse intervals 516 to 522. It should be noted that all the pulse intervals 514-522 are not necessarily the same width, because pulse initiation is triggered by temperature, not by the passage of time. Eventually, the fuel supply became exhausted and, despite several pulses in the portion of the graph indicated at 524, the fire died.

We found that, for a given combination of bio-fuel burning device and fuel, the temperature of an idle fire gradually declines to a characteristic value, and then quickly declines and then the fire goes out. At and above the characteristic temperature, the fire generates relatively little smoke, and it is relatively easy to increase the intensity of the fire by opening the damper 110 to introduce air. However, below the characteristic temperature, the fire becomes smoky and difficult to revive. The intelligent controller 109 may be configured to monitor temperature over time and estimate this characteristic temperature, i.e., the temperature at which the slope of the temperature curve changes. This characteristic temperature is preferably used as the trigger for pulsing. Absent such an automatically determined trigger temperature, 200° F. may be used for a relatively tight unit, whereas higher temperatures, such as about 375-400° F., may be used less efficient units.

As noted, we prefer to initiate a pulse based on temperature, rather than based on the passage of time. Nevertheless, we discovered that with adequate fuel for the fire box 108 (FIG. 1), the pulses tend to occur at fairly regular time intervals, as can be seen for pulses 514-522. The intelligent controller 109 may be configured to record the times of the pulses and calculate a typical pulse interval. Although this typical pulse interval may vary, based on several factors, such as stove-specific factors, fuel type and ambient temperature, the average pulse interval changes slowly, if at all, for a given set of stove factor while the fuel supply is adequate. However, when the fuel supply is low, we found that the temperature-triggered pulses occur more frequently, as can be seen in the portion 524 of the graph in FIG. 5. Thus, the intelligent controller 109 may be configured to estimate the typical pulse interval and revise this estimate over time and then detect a low-fuel condition by detecting pulsing more frequently than the estimated typical pulse interval for the bio-fuel fired device.

We also discovered that, when the fuel supply is low, pulsing may not restore the temperature to the target value. This effect can be seen in the portion 524 of the graph of FIG. 5. Thus, if pulsing fails to restore the desired temperature, the intelligent controller 109 may conclude that the fuel supply is low. Although stack temperature may be used to detect when to initiate a pulse and whether the pulse succeeds in restoring the desired temperature, with more efficient units, the stack temperature is lower, and varies less, than with less efficient units. Therefore, measuring flue temperature below the catalyst may be more accurate, because the temperature below the catalyst has not been artificially raised by the combustion of smoke by the catalyst.

The intelligent controller 109 may decrease the pulse interval if it detects a high moisture content, such as more than about 20% water, in the flue gas. Such a high moisture content may indicate frozen or green wood is being burned, which requires more oxygen. Similarly, pulsing frequency may be increased after a fuel reload (such as detected by a door-open event, sudden drop of more than about 50° F. in stack temperature or high flue flow rate) or a cold start. High-frequency pulsing may involve pulsing for about two minutes every about 15 minutes.

Air Control

As noted, controlling the amount of oxygen available for the fire in the fire box 108 and for the catalyst 140 are important to operating the device 100 efficiently and cleanly. For example, after a large load of fuel has burned, a condition known as "bridging" often occurs, in which low-lying fuel is consumed by the fire, leaving an arc of coal that bridges the volume previously occupied by the now-consumed fuel. Collapse of the bridge typically consumes a large quantity of oxygen as the fire momentarily flares. After the oxygen has been consumed, the remaining coals often generate a large quantity of smoke. When the intelligent controller 109 detects a bridging event, such as by a signature change in temperature, a sudden increase in smoke or a sudden decrease in excess oxygen, the controller shuts the damper 110 and turns off the blower 114 for about ten to 15 minutes. It is counter-intuitive to shut the damper 110 in response to such an increase in temperature. After the about ten to 15-minute period during which the fire re-establishes itself, the controller 109 gradually opens the damper 110 to introduce progressively larger amounts of air. In some embodiments, the damper 110 is left open for at least about 15 minutes, even if the excess oxygen level is below the predetermined value, such as about 3-4%. Pulsing may also be used to recover from a bridging event.

Automatic Notification of Out-of-Fuel Condition

As noted, the intelligent controller 109 may be coupled to a wireless transmitter 192. Using this transmitter 192, the intelligent controller 109 may notify a user of a low-fuel condition, such as by sending an e-mail message or a text message or by placing a telephone call to the user's mobile communication device 196 or to another device. Similarly, the intelligent controller 109 may log data about operation of the bio-fuel fired unit to a remove data recorder 194.

In some situations, such as a bio-fuel fired unit that is largely unattended or in a remote location, fuel may be automatically fed to the bio-fuel fired unit, such as by an auger. However, the fuel supply to the auger is limited. Once the auger's supply is depleted, the intelligent controller 109 may detect the low-fuel condition, as described above, and notify a fuel supplier to deliver another load of fuel.

Optionally or in addition, the intelligent controller 109 may be coupled to a wireless receiver or transceiver, also designated 192. In this case, the intelligent controller 109 may receive messages, such as queries or instructions, from a user, such as in the form of e-mail or text messages, via a dedicated mobile telephone application or web site served by the intelligent controller 109 or by the remote data recorder 194. In such a context, a user may query the intelligent controller 109 to ascertain operating conditions, such as amount of heat generated over time, an estimate of the amount of fuel consumed to generate this heat or an estimate of the amount of fuel remaining. The user may command the intelligent controller 109 to change operating parameters, such as preferentially generating domestic hot water rather than space heating, or visa-versa.

Modes of Operation

In one mode of operation, referred to herein as "master," the intelligent controller 109 operates essentially continuously. In master mode, the intelligent controller 109 is preferably powered continuously. Furthermore, calls for heat, such as from the aquastat 128 that indicates the water jacket 118 temperature has fallen below its set point. In response, the intelligent controller 109 opens the damper 110 and/or operates the blower 114 to operate the bio-fuel fired device 100 and, thereby, heat the water in the water jacket 118. Similar operations may be triggered by thermostats in dwellings that are heated by the bio-fuel fired device 100, coffee bean roasting devices, etc.

In contrast to master mode, the intelligent controller 109 may be operated in "slave" mode. In slave mode, the intelligent controller 109 is preferably not powered continuously. Instead, the intelligent controller 109 is powered only while the bio-fuel fired device 100 is operating, that is, while the damper 110 is open and/or the blower 114 is operating. Thus, in some cases, the intelligent controller 109 may be connected to the power supply for the damper 110 or the blower 114, so that the intelligent controller 109 receives operating electrical power only when the damper 110 is open and/or the blower 114 operates. Thus, in slave mode, the intelligent controller 109 does not control the damper 110 or the blower 114. However, the intelligent controller 109 controls the catalyst heater 140, and it may control an air injector 178 and/or a draft inducer 174.

In slave mode, the intelligent controller 109 executes an initialization sequence each time it is powered up. Thus, in slave mode, timeout timers, such as Preheat_State_Max_Time (the amount of time after which the unit enters Lockout State if the temperature below the catalytic converter 140 fails to reach a predetermined value; see Table 2), are reset for each call for heat. Slave mode consumes less electric power than master mode and may increase service life of the intelligent controller 109. The operating mode may be selected by a jumper or a switch, such as mode switch 190 (FIG. 1).

As noted, various combinations of disclosed components may be used in various embodiments. In one embodiment, the intelligent controller 109 merely controls the heater 154 to maintain the catalytic converter 140 at least at its minimum operating temperature, regardless of whether the bio-fuel fired device 100 is operating or not. In other words, it does not matter if a fire is burning in the device 100. In some locations, electricity cost is low enough to justify keeping the catalyst at least at its minimum operating temperature, even if the device 100 is not used for hours or days. In some such embodiments, the minimum operating temperature of the catalyst 140 is set to about 599° F.

Other Embodiments

Although a catalyst-based pollution control device 138 is described herein, the intelligent controller 109 may be used advantageously with other types of pollution control devices. For example, some well-known pollution control devices include an electrostatic precipitator (ESP). Although an ESP does not benefit from a warm-up cycle, ESPs nevertheless consume electrical power when they operate. The disclosed intelligent controller 109 may be configured to control operation of an ESP. For example, the ESP may be powered on only when the damper 110 is open or when the intelligent controller 109 ascertains that smoke is being, or is likely to be, generated.

As the catalyst 140 combusts particulates and gases, heat can be generated ranging from about 700° F. to about 1,800° F. This heat is commonly lost up the stack. A liquid or air heat exchanger (not shown) installed after the catalyst 140 may be used to recover this heat and produce heated water or air for domestic or industrial purposes, such as space heating or generating electrical power.

As described above, the intelligent controller 109 may control a heater 154 for a catalytic converter 140 and/or one or more air handlers 110, 114, 174, 178, based on one or more measured quantities, such as stack temperature, catalyst temperature, oxygen level, etc. Although some combinations of measured quantities and controlled items are described, other combinations are contemplated. For example, the air handler 110, 114, 174, 178 may be operated in response to detecting smoke with the smoke detector 180 or in response to detecting insufficient flow with the gas flow detector 170. Control of the air handler 110, 114, 174, 178 need not be binary, i.e., on or off. A degree to which the air hander 110, 114, 174, 178 is operated, such as a degree to which the damper 110 is opened or the speed of the blower 114, may be adjusted up or down, based on measured the measured quantities. Similarly, operation of the heater 154 may be based on measured quantities other than, or in addition to, the temperature of the catalyst 140.

Some embodiments of the intelligent controller 109 have been described as being configured to automatically learn about a bio-fuel fired device by recording measured parameters over time and performing calculations on the measured parameters and to use the learned information to operate or adjust operation of the device. Although this learning was described in the context of pulsing, the intelligent controller 109 may be configured to automatically respond to other aspects of the device's operation. For example, hard wood typically burns hotter than soft wood. Thus, the intelligent controller 109 may be configured to adjust its parameters, such as the temperature at which pulsing is initiated, based on the typical burn characteristics measured recently by the controller.

Several models of operation of the bio-fuel fired device 100 may be defined, such as burning dried timber, burning wood pellets, burning branches, burning green wood, burning wood that includes significant bark (which tends to generate considerable particulate matter), burning wood that does not include bark, and the like. The intelligent controller 109 may be configured to make measurements and estimate which of several models most closely approximate the measured conditions, and the controller may set or modify parameters, such as the variables listed in Table 2, according to the model. The intelligent controller 109 may dynamically revise the model selection, such as over time. For example, after bark has burned off, the remaining wood may burn according to a different model.

As used herein, the term "call for heat" or "heat call" means a signal indicating a request to generate heat by the subject bio-fuel fired device. Such as signal may be generated by, or derived from, a sensor, another controller or a remote control. Exemplary sensors include an aquastat thermally coupled to the water jacket 118, a thermostat thermally coupled to the bio-fuel fired device 100 or something the device 100 directly or indirectly heats, such as a water tank, living space or other space. An exemplary remote control includes a mobile telephone, an application program being executed by the mobile telephone or a web page served by the intelligent controller 109 or the remote data recorder 194 or a browser displaying the web page. An intelligently-controlled catalytic converter has been described as including a processor controlled by instructions stored in a memory. The memory may be random access memory (RAM), read-only memory (ROM), flash memory or any other memory, or combination thereof, suitable for storing control software or other instructions and data. The intelligent controller can also be accessed through a wireless connection to monitor, report and manage functions. Some of the functions performed by the intelligently-controlled catalytic converter have been described with reference to flowcharts and/or block diagrams. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, although some aspects of an intelligently-controlled catalytic converter have been described with reference to a flowchart, those skilled in the art should readily appreciate that functions, operations, decisions, etc. of all or a portion of each block, or a combination of blocks, of the flowchart may be combined, separated into separate operations or performed in other orders. Moreover, while the embodiments are described in connection with various illustrative data structures, one skilled in the art will recognize that the system may be embodied using a variety of data structures. Furthermore, disclosed aspects, or portions of these aspects, may be combined in ways not listed above. Accordingly, the invention should not be viewed as being limited to the disclosed embodiments.

What is claimed is:

1. A method for controlling a bio-fuel fire, the method comprising:
 providing a bio-fuel fire control system that includes:
   a first port configured to be coupled to a first oxygen level sensor disposed upstream of a catalytic pollution control device;
   a second port configured to be coupled to a second oxygen level sensor disposed downstream of the catalytic pollution control device;
   a third port configured to be coupled to an air handler that supplies air to the bio-fuel fire; and
   a controller coupled to the first, second and third ports;
 repeatedly receiving, via the first and second ports, respective first and second signals indicating first and second amounts of oxygen in exhaust gas from a bio-fuel fire, thereby receiving a series of first and second oxygen level samples;
 for each first and second oxygen level sample:
   comparing, by the controller, the first oxygen level sample to a first predetermined value;
   if, as a result of the comparing, the first oxygen level sample is found to be less than the first predetermined value, generating, by the controller, a first control signal configured to cause the air handler to increase a rate at which the air handler supplies air to the bio-fuel fire;
   comparing, by the controller, the second oxygen level sample to a second predetermined value, less than the first predetermined value;
   if, as a result of the comparing, the second oxygen level sample is found to be less than the second predetermined value, generating, by the controller, the first control signal; and
   if the first control signal is generated:
     sending, via the third port, the generated first control signal to the air handler; and
     in response to the generated first control signal, increasing, by the air handler, the rate at which air is supplied to the bio-fuel fire.

2. A method according to claim 1, wherein:
the second predetermined value is in a range of about 3-4%.

3. A method according to claim 2, wherein:
the first predetermined value is in a range of about 9-13%.

4. A method according to claim 1, further comprising, for each first and second oxygen level sample:
 if, as a result of the comparing, the first oxygen level sample is found to be greater than a third predetermined value, greater than the first predetermined value, generating, by the controller, a second control signal configured to cause the air handler to decrease the rate at which the air handler supplies air to the bio-fuel fire;
 if, as a result of the comparing, the second oxygen level sample is found to be greater than a fourth predetermined value, greater than the second predetermined value, generating, by the controller, the second control signal;
 if the second control signal is generated:
   sending, via the second port, the generated second control signal to the air handler; and
   in response to the generated second control signal, decreasing, by the air handler, the rate at which air is supplied to the bio-fuel fire.

5. A method according to claim 4, wherein:
the fourth predetermined value is in a range of about 3-4%.

6. A method according to claim 4, wherein:
the third predetermined value is in a range of about 9-13%.

7. A method according to claim 1, further comprising, for each first and second oxygen level sample:
- if, as a result of the comparing, the first oxygen level sample is found to be less than a fifth predetermined value and the first oxygen level samples have remained less than the fifth predetermined value for at least a predetermined amount of time, generating, by the controller, a third control signal configured to cause the air handler to cease supplying air to the bio-fuel fire;
- if, as a result of the comparing, the second oxygen level sample is found to be less than a sixth predetermined value, and the second oxygen level samples have remained less than the sixth predetermined value for at least the predetermined amount of time, generating, by the controller, the third control signal;
- if the third control signal is generated:
  - sending, via the second port, the generated third control signal to the air handler; and
  - in response to the generated third control signal, ceasing, by the air handler, to supply air to the bio-fuel fire.

8. A method according to claim 7, wherein:
the fifth predetermined value is in a range of about 9-13%;
the sixth predetermined value is in a range of about 3-4%; and
the predetermined amount of time is a total of about three minutes within a thirty minute period.

9. A method according to claim 1, further comprising:
repeatedly calculating, by the controller, respective first and second rates of decrease of successive first and second oxygen level samples in the series of first and second oxygen level samples;
comparing, by the controller, the first and second rates of decrease to a seventh predetermined value;
if, as a result of the comparisons, any of the first and second rates of decrease is found to be greater than an eighth predetermined value:
- generating, by the controller, a fourth control signal configured to cause the air handler to cease supplying air to the bio-fuel fire;
- if the fourth control signal is generated:
  - sending, via the second port, the generated fourth control signal to the air handler;
  - in response to the generated fourth control signal, ceasing, by the air handler, to supply air to the bio-fuel fire;
  - about 10-15 minutes after sending the fourth control signal to cease supplying air, generating, by the controller, and sending at least one fifth control signal configured to cause the air handler to supply progressively larger amounts of air to the bio-fuel fire and continue supplying air to the bio-fuel fire for at least about 15 minutes, regardless of any first and second oxygen level samples taken during the at least about 15 minutes;
  - if the fifth control signal is generated, in response to the generated fifth control signal, supplying, by the air handler, progressively larger amounts of air to the bio-fuel fire and continuing, by the air handler, to supply air to the bio-fuel fire for at least about 15 minutes.

* * * * *